United States Patent [19]

Halling

[11] Patent Number: 4,681,353
[45] Date of Patent: Jul. 21, 1987

[54] V-COUPLING FOR INSTALLATION IN NARROW ANNULAR SPACES

[75] Inventor: Horace P. Halling, Laurel, Md.

[73] Assignee: Pressure Science Incorporated, Beltsville, Md.

[21] Appl. No.: 631,795

[22] Filed: Jul. 17, 1984

[51] Int. Cl.[4] .............................................. F16L 23/00
[52] U.S. Cl. ......................................... 285/411; 24/25
[58] Field of Search ............... 285/411, 410, 407, 366, 285/365, 367, 409, 408; 24/25, 20 LS

[56] References Cited

U.S. PATENT DOCUMENTS

| 1,966,039 | 7/1934 | Muchnic | 285/411 X |
| 2,178,819 | 11/1939 | Timm | 285/411 |
| 2,653,836 | 9/1953 | Christophersen et al. | |
| 2,836,117 | 5/1958 | Lankford | 285/365 X |
| 2,922,212 | 1/1960 | Textrom | 24/25 X |
| 3,019,036 | 1/1962 | Stanger | |
| 3,231,298 | 1/1966 | Tomb et al. | 285/365 X |
| 3,368,251 | 2/1968 | Williams | |
| 3,575,432 | 4/1971 | Taylor | |
| 3,600,770 | 8/1971 | Halling | |
| 3,986,746 | 10/1976 | Chartier | |
| 4,460,201 | 7/1984 | McGugan | 285/365 |

FOREIGN PATENT DOCUMENTS

| 1403430 | 5/1965 | France. | |
| 854629 | 11/1960 | United Kingdom | 285/367 |
| 1140636 | 1/1969 | United Kingdom. | |
| 651170 | 3/1979 | U.S.S.R. | 285/366 |

Primary Examiner—Thomas F. Callaghan
Attorney, Agent, or Firm—Roylance, Abrams, Berdo & Goodman

[57] ABSTRACT

A V-coupling device for coupling coaxial annular flanges comprising at least two arcuate coupling members, a pivoting mechanism for pivotally and releasably coupling the coupling members at their first ends, and a tightening mechanism which includes an axially-oriented rotatable member for coupling the members together at their second ends and moving them radially inwardly. The tightening mechanism has a pair of camming surfaces that act upon cam follower surfaces integrally formed on the second ends of the arcuate coupling members. The camming surfaces move axially in response to rotation of the axially-oriented rotatable member. The coupling device is especially suited for installation in narrow annular space where tangentially-oriented tightening mechanisms are difficult to use.

11 Claims, 12 Drawing Figures

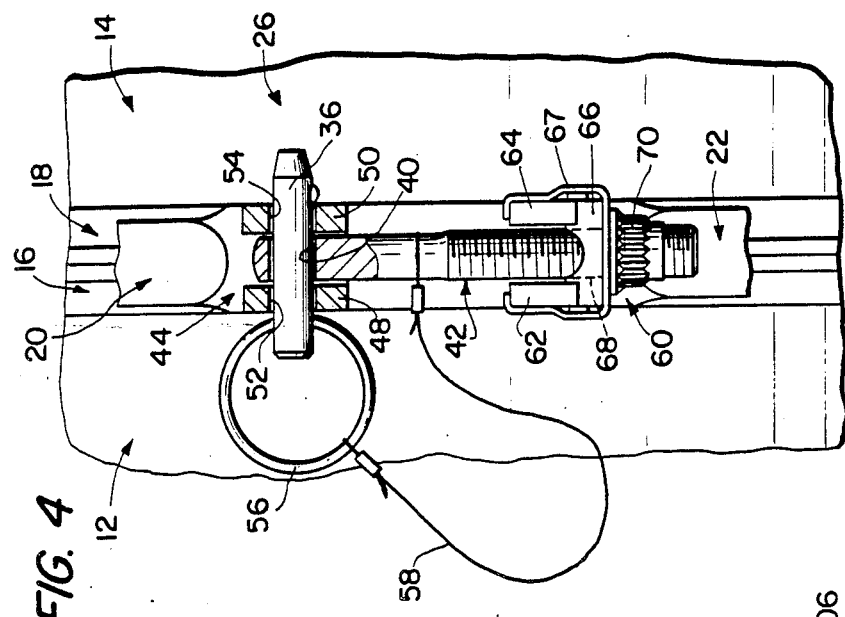
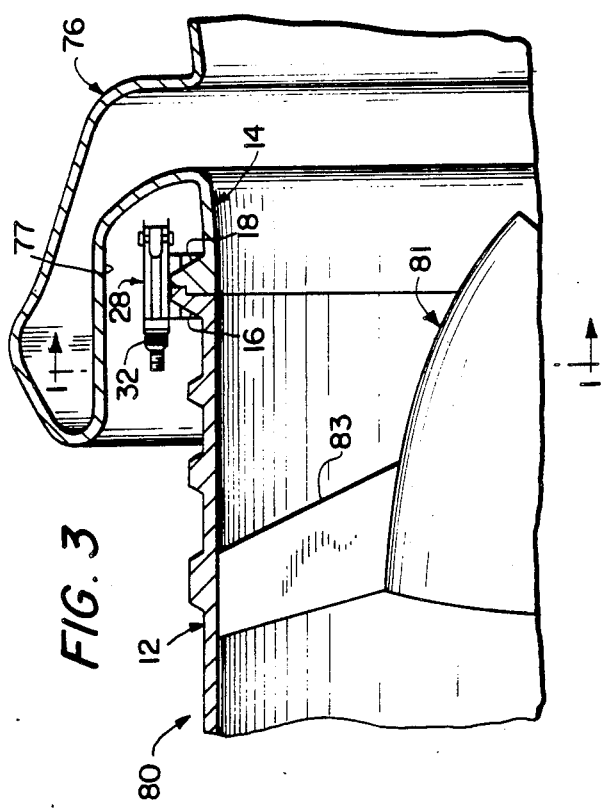
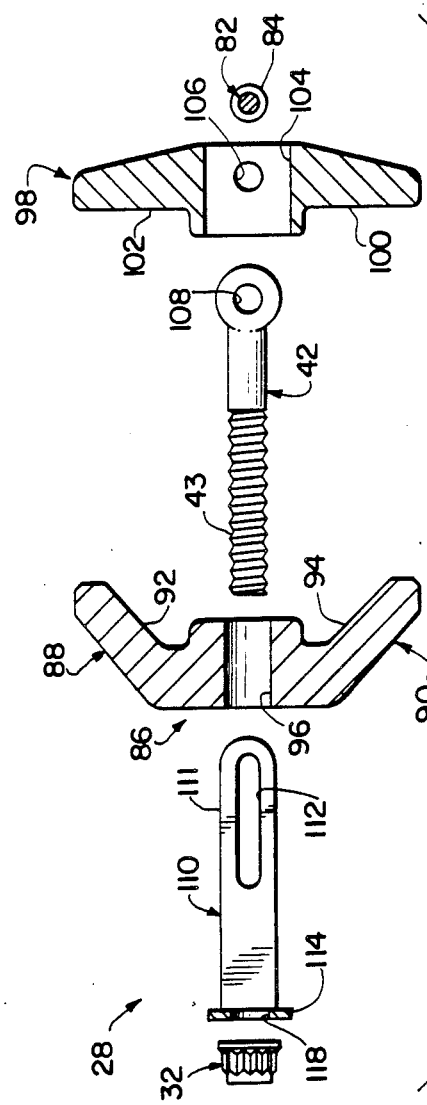
FIG. 4
FIG. 3
FIG. 5

V-COUPLING FOR INSTALLATION IN NARROW ANNULAR SPACES

FIELD OF THE INVENTION

The invention relates to a coupling device for coupling the flange of one annular member to the flange of a second annular member. More specifically, the invention relates to such a coupling device that may be installed and removed in narrow annular spaces. The invention can be used, for example, to couple an inlet particle separator to the front of a helicopter gas turbine engine. The device includes two arcuate coupling members, which are joined at their first ends by a pivotal coupling, and are joined at their second ends by a tightening mechanism having an axially-oriented rotatable member.

BACKGROUND OF THE INVENTION

Circular V-couplings for clamping the flanges of annular members have been used for many years. Examples of these couplings are disclosed in U.S. Pats. Nos. 2,653,836 to Christophersen et al; 3,019,036 to Stanger 3,575,432 to Taylor; and 3,600,770 to Halling; French Pat. No. 1,403,430 to Avica; and British Pat. No. 1,140,636 to Brownhill et al.

While these V-couplings have proven capable of coupling the flanges of annular members, they invariably contain the disadvantage of having tightening means which have tangentially-oriented rotatable members, such as nuts or bolts. Thus, they require a reasonably open area in which to freely rotate a tool for tightening the tangentially-oriented rotatable members. Situations arise, however, where V-couplings must be installed in areas of limited radial accessibility, thereby making the task of tightening tangentially-oriented rotatable members impractical, if not impossible. Such a situation has arisen in the context of attempting to attach an inlet particle separator to the front of a helicopter gas turbine engine. Here, installation must be accomplished in a narrow annular space having a radial width only slightly larger than the radial width of the coupling itself. Until now, the coupling for such an application has required numerous bolts and nuts, which require extensive expenditures of time and energy to tighten. Furthermore, the use of special tools is not permitted in some situations because the lack of availability of such a special tool might delay restoring the equipment to operation. This would be completely unacceptable, especially in the context of military use.

Thus, there exists a continuing need for a coupling device which may be installed quickly in spaces of limited radial accessibility and by the use of ordinary tools.

SUMMARY

Accordingly, a primary object of the invention is to provide a coupling device which may be quickly installed in an area of limited radial accessibility.

Another object of the invention is to provide a coupling device which may be installed using ordinary tools.

The foregoing objects are basically attained by providing a device for coupling a first peripheral flange on a first annular member and a second peripheral flange on a second annular member, these flanges being coaxial, the combination comprising: at least first and second arcuate coupling members, each arcuate coupling member having an inner surface including a recess for receiving portions of the first and second peripheral flanges therein, and having first and second ends; a pivot mechanism, coupled to the first ends of the first and second arcuate coupling members, for pivotally coupling the first ends together; and a tightening mechanism, coupled to the second ends of the first and second arcuate coupling members, for coupling the second ends together and for radially inwardly moving the first and second arcuate coupling members into intimate contact with the first and second flanges, the tightening mechanism including a rotatable member, which is oriented in an axial direction parallel to the axes of the coupled coaxial flanges.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 3 is a fragmentary side elevational view in longitudinal cross section of a coupling device in accordance with the invention shown coupling an inlet particle separator to the front of a helicopter gas turbine engine;

FIG. 4 is a side elevational view with parts broken away of a pivot mechanism which may be used in the coupling device in accordance with the invention as seen in FIGS. 1 and 2;

FIG. 5 is a side elevational, exploded cross-sectional view of the tightening mechanism in accordance with the invention;

DETAILED DESCRIPTION OF THE INVENTION

Figure 1:
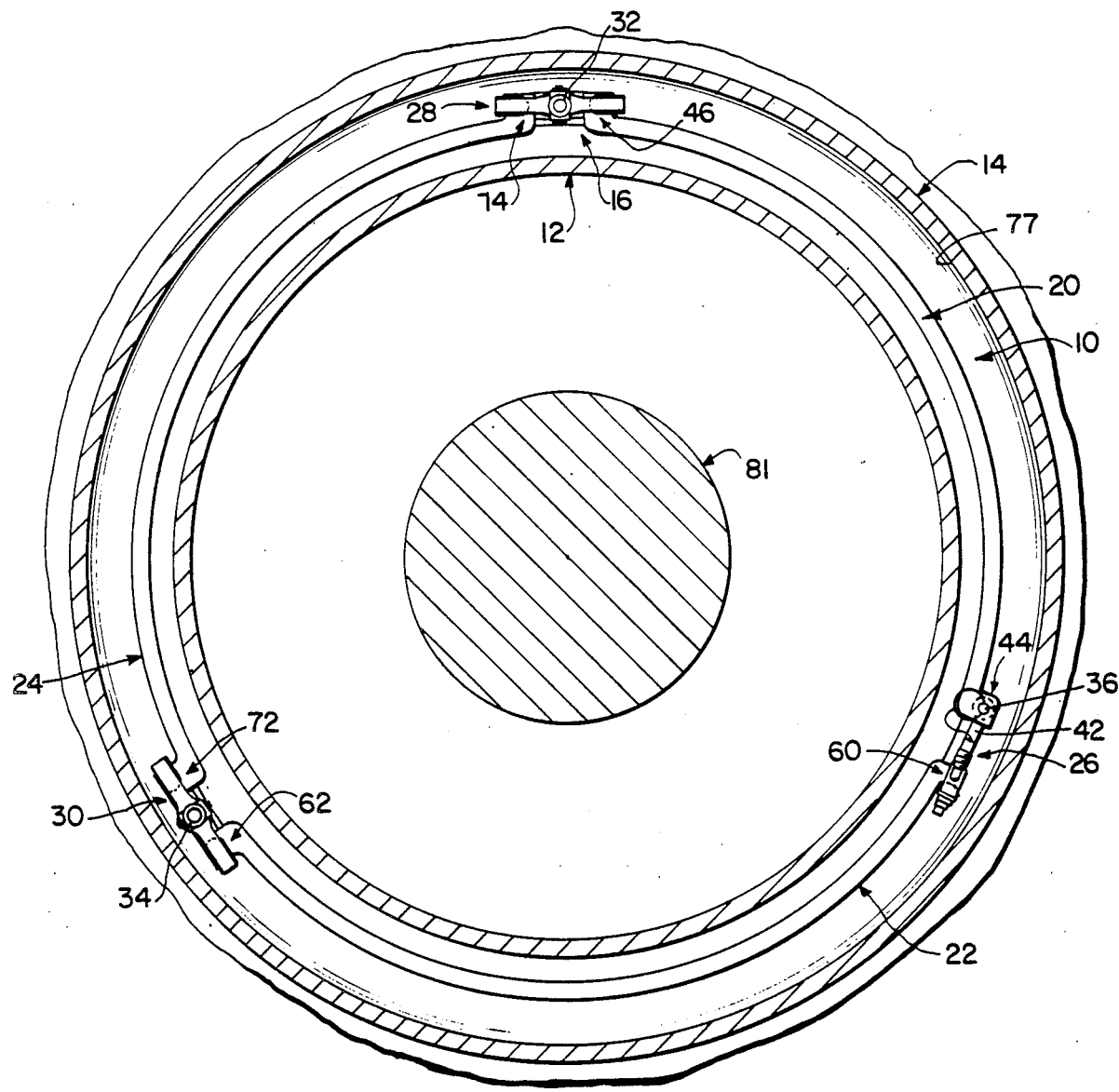
FIG. 1 is a rear elevational view in section taken along line 1—1 in FIG. 3 of a coupling device in accordance with the invention coupling a pair of annular flanges together, these flanges in turn being coupled to a pair of annular members, the coupling device being shown in the closed, or tightened configuration.
Figure 2:
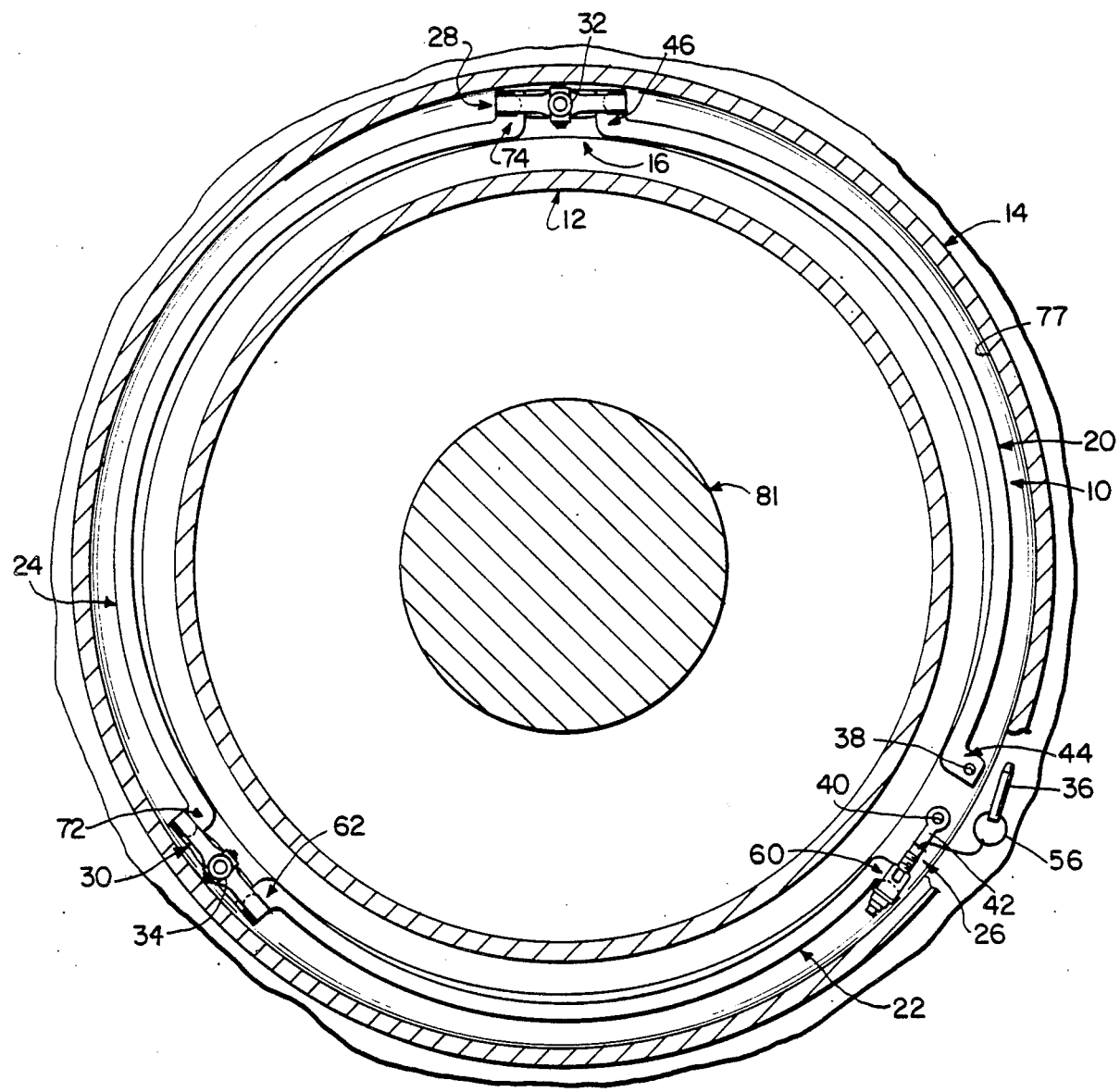
FIG. 2 is a rear elevational view of the coupling device of the invention as shown in FIG. 1 except in an open or untightened configuration, i.e. the pivot mechanism is uncoupled, and the two tightening mechanisms are in untightened configurations.
Figure 8:
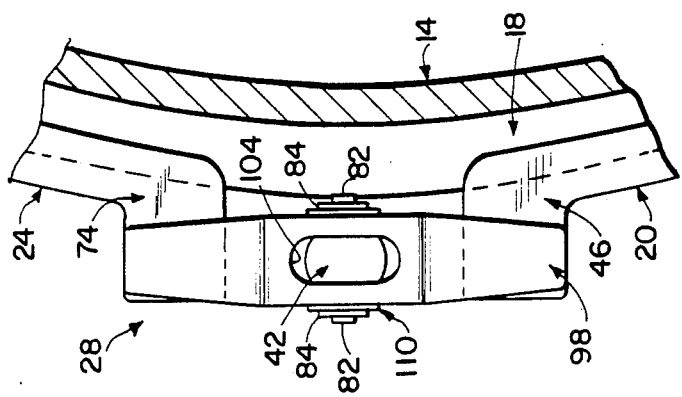
FIG. 8 is a fragmentary front elevational view of the tightening mechanism of FIG. 6, coupling two arcuate coupling members together, the tightening mechanism being in the open or untightened configuration.

Referring now to FIGS. 1, 2 and 3, the coupling device 10, in accordance with the invention, connects and couples first and second annular members 12 and 14 by engaging a first annular flange 16 coupled to the first annular member 12, and a second annular flange 18 coupled to the second annular member 14, these annular members and flanges being coaxial. The coupling device 10 is comprised of first, second, and third arcuate coupling members 20, 22, and 24, a pivot mechanism 26 which pivotally couples arcuate coupling members 20 and 22, a first tightening mechanism 28 for connecting arcuate coupling members 20 and 24, and a second tightening mechanism 30 for connecting arcuate coupling members 22 and 24. Tightening mechanisms 28 and 30 are identical and include rotatable members 32 and 34, each of which rotate about an axis parallel to the axes of the coaxial annular members and thus allow tightening in a narrow annular space by conventional tools.

FIG. 1 illustrates the coupling device in a closed or tightened configuration, i.e., the pivot mechanism 26 is in a closed configuration and first and second tightening mechanisms 28 and 30 are in closed configurations. FIG. 2 is substantially the same as FIG. 1, with the exception that FIG. 2 illustrates the coupling device in an open or untightened configuration, i.e., the pivot mechanism 26 is in an open configuration with snap-locking pin 36 disengaged from the coaxial bore created by coaxially aligning the transverse bore 38 in arcuate member 20 with the transverse bore 40 in the pivot mechanism connecting means or eye bolt 42, and tightening mechanisms 28 and 30 are in their open configurations. The expressions, open or untightened configuration, and closed or tightened configuration for tightening mechanisms 28 and 30 will be fully explained hereinafter in the discussions of FIGS. 6-11.

Each of the first, second, and third arcuate coupling members has a substantially V-shaped cross section, and comprises slightly less than a 120° circumferential arc, although in practice they may be of any desired circumferential length. Each has a trapezoidal-shaped recess 45 (FIG. 9) for engaging the tapered flanges 16 and 18 of the first and second annular members. Each of the arcuate coupling members has first and second ends which comprise radially outwardly extending extensions. These extensions engage either the pivot mechanism 26 or the tightening mechanisms 28 and 30.

As seen in FIG. 2, arcuate coupling member 20 has a first end 44 and a second end 46. The first end 44 has a transverse bore 38 therethrough which is designed to coaxially align with bore 40 in connecting means 42 to receive snap-locking pin 36. The first end 44 of arcuate coupling member 20, and the pivotal coupling mechanism 26 can be seen in greater detail in FIG. 4. As seen in FIG. 4, the first end 44 has two parallel planar radially outwardly extending legs 48 and 50, each of which contains coaxial bores 52 and 54. These coaxial bores, when viewed together, comprise transverse bore 38. Bores 52 and 54 are coaxially aligned with the transverse bore 40 in the pivot mechanism connecting means 42 and the snap-locking pin 36 is inserted therethrough. The snap-locking pin may optionally contain a pull ring 56 and a cable 58 for connecting the pull ring 56 to the pivot mechanism connecting means 42. Cable 58 may ordinarily comprise a string or wire or other flexible means for retaining the pin in the vicinity of connecting means 42.

Figure 12:
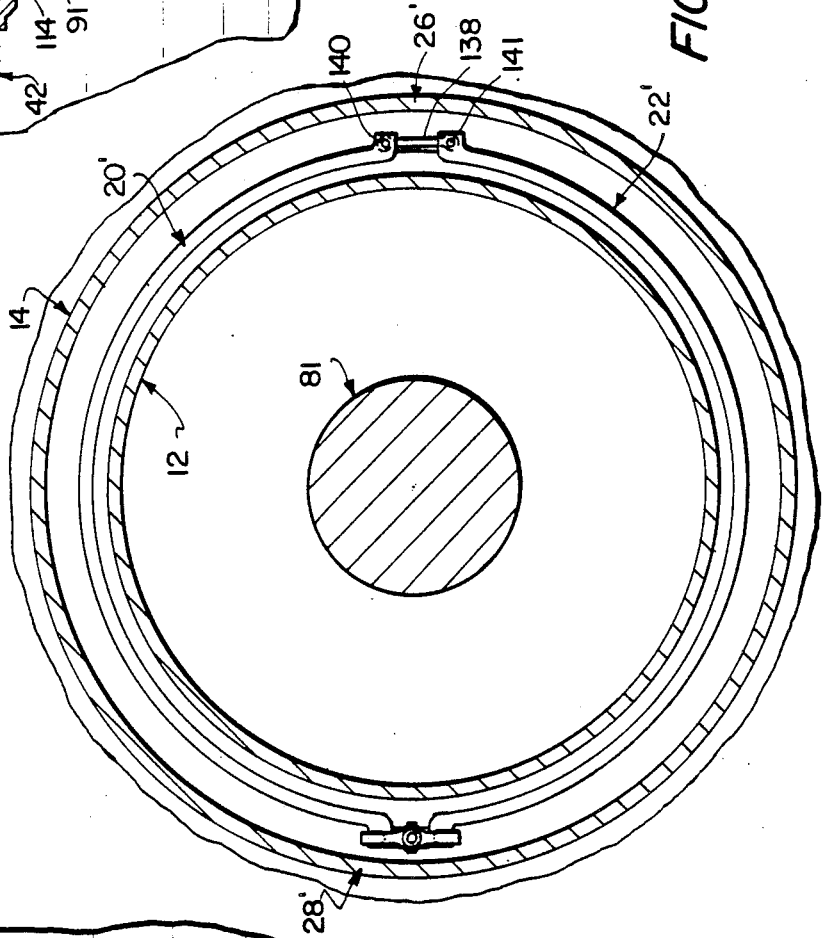
FIG. 12 is a rear elevational view in section showing a modified coupling device using only two coupling members.

As seen in FIGS. 1 and 2 arcuate coupling member 22 contains a first end 60 and a second end 62. The first end 60 may be seen in greater detail in FIG. 4. As seen in FIG. 4 the first end 60 comprises radially outwardly extending parallel planar legs 62 and 64, and a plate 66 having an axial bore 68, which are designed to receive connecting eye bolt 42 therethrough. A clamp 67 connects plate 66 to legs 62 and 64. When the connecting eye bolt 42 is inserted through bore 68, it is then secured by securing means or nut 70 and rotation of this nut can move members 20 and 22 to adjust their circumferential spacing. In practice, the connecting means may ordinarily comprise a threaded eye bolt and the securing means may ordinarily comprise a nut, although equivalent means which connect and secure are permissible. Furthermore, while the above-described pivot and coupling mechanism 26 of FIG. 4 is preferred, any means for pivoting the arcuate coupling members is permissible and within the scope of this invention. Especially preferred are pivotal means which provide for quick connection and disconnection although a "dog-bone" shaped pivot link could be used as seen in FIG. 12.

The third arcuate coupling member 24 has first and second ends 72 and 74 as seen in FIGS. 1 and 2. These first and second ends are identical and are also identical to ends 46 and 62 on coupling members 20 and 22. For present purposes only two ends 46 and 74 will be described in detail hereinafter. These ends are to be connected by the two tightening mechanisms 28 and 30 which are also identical. These ends are comprised of radially outwardly extending extensions with tapered cam follower surfaces 128 and 130 thereon. Examples of these ends and the cam follower surfaces may be seen in greater detail in FIGS. 7, 10 and 11.

Referring now to FIG. 3, the coupling device 10 of the invention is shown coupling an inlet particle separator 76, which is coupled to the second annular member 14, to the front of an engine casing, which forms the first annular member 12, on a helicopter gas turbine engine 80, having a nose piece 81 and an inlet guide vane 83. In this environment, the utility of tightening mechanisms 28 and 30 can readily be seen. The axially-oriented rotatable member 32, which may ordinarily comprise a nut or bolt, can be rotated by means of an ordinary torque wrench using a commonly available extension. On the other hand, a tightening mechanism with a tangentially-oriented rotatable member would be nearly impossible to tighten given the narrow annular space created by the engine casing 12 and the inlet particle separator 76 inner annular surface 77.

Referring now to FIG. 5, an exploded view of the tightening mechanism 28 is shown. It comprises a transverse pin 82, a pair of retaining washers 84, a first tightening member 86 having angularly outwardly extending arms 88 and 90, camming surfaces 92 and 94 thereon, and a central axial bore 96; a second tightening member 98 having coplanar surfaces 100 and 102, central axial slot 104 and transverse bore 106 perpendicular to and intersecting axial slot 104; the axially-oriented tightening mechanism connecting means 42, which may ordinarily be an eye bolt or some internally threaded connector, having transverse bore 108 and threaded section 43; a U-shaped retaining member 110 having a pair of parallel legs 111, each having an elongated slot 112, and, optionally, an enlarged area of reinforcement 114 at the bight of the member; and an axially-oriented rotatable member 32, which may ordinarily comprise a nut, or threaded member such as a bolt. The bight on U-shaped member 110 has a bore 118 receiving bolt 42.

In practice, the connecting means 42 is inserted into axial slot 104 such that transverse bores 106 and 108 are coaxially aligned; the first tightening member 86 is then slipped over connecting means 42 by inserting the threaded section 43 of the connecting means 42 through axial bore 96; the retaining member is then slipped over the end of connecting means 42, which extends through bore 96, by inserting threaded section 43 through the bore 118 in retaining means 110 so that the elongated slots 112 align with the coaxially aligned transverse bores 106 and 108; pin 82 is then inserted through the elongated slots 112 and coaxially aligned transverse bores 106 and 108. Thereafter, retaining washers 84 are placed over the reduced ends of pin 82, which are then expanded by upset riveting to lock the washers in place. Rotatable member 32 is then threadedly attached to threaded section 43 which protrudes through bore 118. This connected assembly is shown in FIGS. 6–11.

Figure 7:
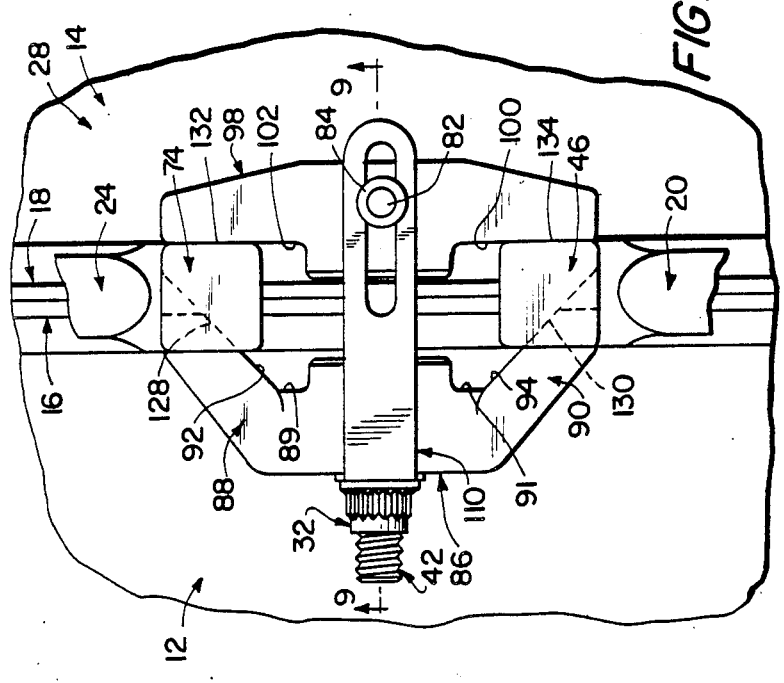
FIG. 7 is a side elevational view of the tightening mechanism of FIG. 6 coupling two arcuate coupling members together, the tightening mechanism being in the open or untightened configuration.
Figure 9:
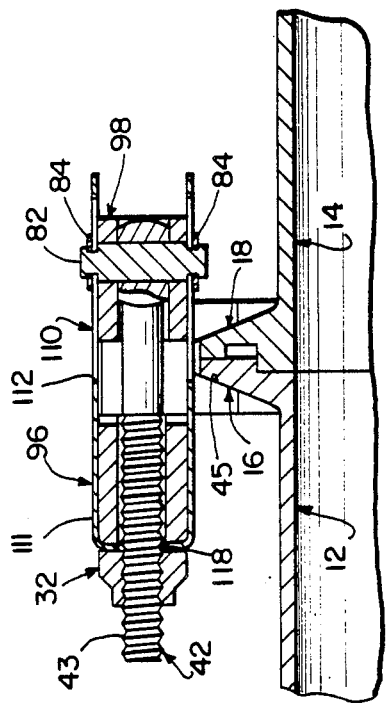
FIG. 9 is a cross-sectional view of the tightening mechanism of FIG. 7 taken along line 9—9 in FIG. 7.
Figure 6:
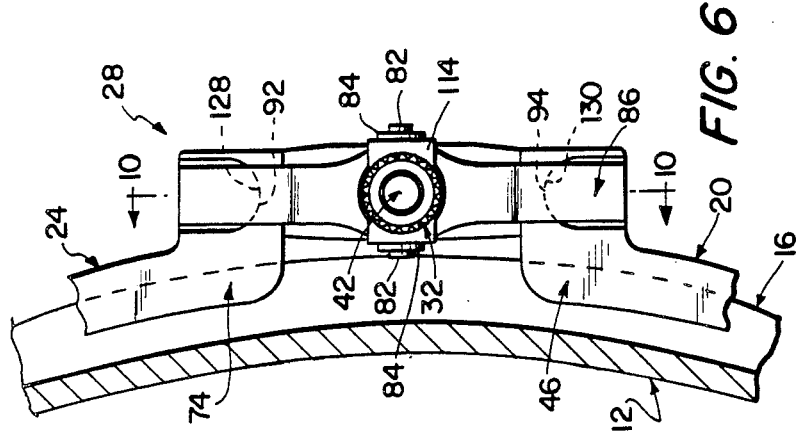
FIG. 6 is a fragmentary rear elevational view showing the tightening mechanism of the invention coupling two arcuate coupling members together, the tightening mechanism being in the open or untightened configuration.
Figure 10:
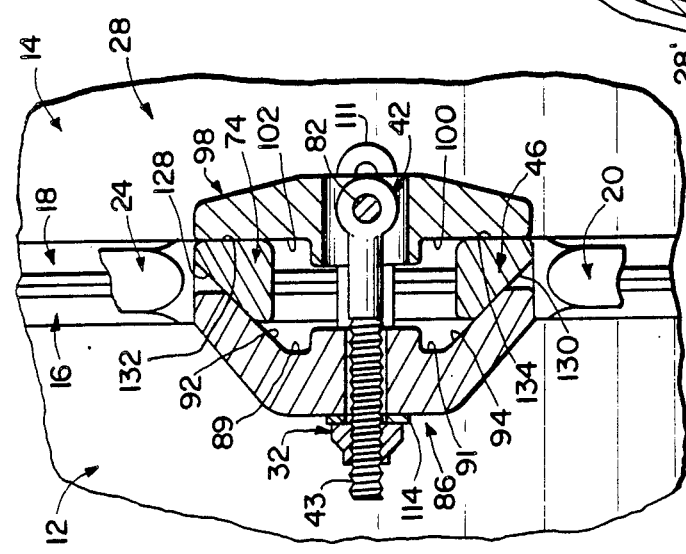
FIG. 10 is a side elevational view in cross section taken along line 10—10 in FIG. 6 of the tightening mechanism of the invention in an open or untightened configuration.

Referring now to FIGS. 6–10, the tightening mechanism 28 of the invention is shown in several views in an open or untightened configuration. This configuration as seen in FIGS. 7 and 10 is indicated by the fact that the second ends 46 and 74 of arcuate coupling members 20 and 24 engage the ends of the angularly outwardly extending arms 88 and 90 on member 86 and the ends of coplanar surfaces 100 and 102 on member 98. Furthermore, the first and second tightening mechanism members 86 and 98 are spaced apart.

As seen in FIG. 7, the cam follower surfaces 128 and 130 of the second ends 74 and 46 are adjacent to and in contact with the camming surfaces 92 and 94 of the angularly outwardly extending arms 88 and 90. The rear surfaces 132 and 134 on ends 74 and 46 are adjacent to and in contact with the coplanar surfaces 102 and 100 of the second tightening mechanism member 98. As seen in FIG. 7, surfaces 92 and 94, as well as surfaces 128 and 130, are at acute angles of about 45° to the axis of bolt 42, which is coaxial with the axis of nut 32 and the axes of flanges 16 and 18.

Figure 11:
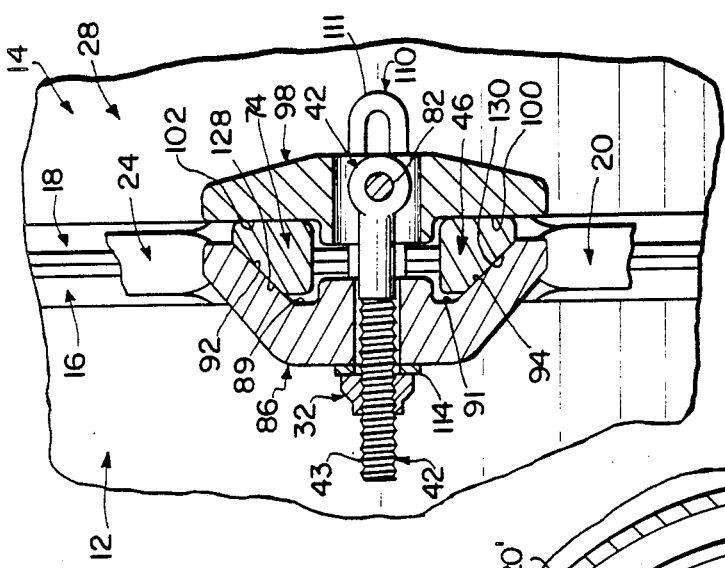
FIG. 11 is a side elevational view in cross section similar to that shown in FIG. 10 except that the tightening mechanism is in a closed or tightened configuration.

Referring now to FIG. 11, the tightening mechanism is shown is a closed or tightened configuration. As seen in FIG. 11, the closed or tightened configuration is easily recognizable by the fact that the second ends 74 and 46 of arcuate coupling members 24 and 20 are themselves spacially closer together and adjacent to the recesses 89 and 91 formed near the bases of the angularly outwardly extending arms 88 and 90. Also, the first and second tightening mechanism members 86 and 98 are spacially closer.

Tightening is accomplished by rotating the axially-oriented rotatable member 32 which in turn forces the first tightening mechanism member 86 spacially towards the second tightening member 98. As a result of this movement, the first and second cam follower surfaces 128 and 130 travel along the camming surfaces 92 and 94 until surfaces 128 and 130 approach the bottoms of the recesses 89 and 91, at which time the tightening torque being applied to the rotatable member 32 reaches its predetermined limit and the coupling mechanism is in a fully closed or tightened configuration. By moving the second ends 74 and 46 into a circumferentially closer spacial relationship, the arcuate coupling members 24 and 20 are drawn radially inwardly, thereby clamping or tightening around flanges 16 and 18 contained on the coaxially aligned annular members 12 and 14.

It should be understood that the axially rotatable member 32 and the tightening mechanism connection means 42 may comprise any means which will connect the first and second tightening mechanism members 86 and 98 and which will bring them into a closer or further spacial relationship upon rotation of the axially-oriented tightening member 32. While it is normally contemplated that these will comprise a nut and a bolt, the axially-oriented rotatable member 32 may itself be a bolt which has threads that, for example, connect with an internally threaded bore in a modified member 42.

It should also be understood that a coupling device of the invention may be comprised of any combination of arcuate coupling members, pivoting mechanisms, and tightening mechanisms having axially-oriented rotatable members, provided that there be at least one such tightening mechanism, one such pivoting mechanism, and two coupling members per coupling device as shown in FIG. 12.

In FIG. 12, the coupling device 10' comprises first and second coupling members 20' and 22', a tightening mechanism 28' and a pivot mechanism 26' including a dog-bone shaped link 138, which is pivotally coupled via rods 140 and 141 to members 20' and 22'. Tightening mechanism 28' is the same as mechanism 28 described above.

While only one embodiment has been chosen to illustrate the invention, it will be understood by those skilled in the art that various changes and modifications can be made therein without departing from the scope of the invention as defined in the appended claims.

What is claimed is:

1. A device for coupling a first peripheral flange on a first annular member and a second peripheral flange on a second annular member, these flanges being coaxial, the combination comprising:

at least first and second arcuate coupling members, each arcuate coupling member having an inner surface including a recess for receiving portions of the first and second peripheral flanges therein, and having first and second ends;

pivot means, coupled to the first ends of said first and second arcuate coupling members, for pivotally coupling said first ends together; and tightening means, coupled to the second ends of said first and second arcuate coupling members, for coupling said second ends together and for radially inwardly moving said first and second arcuate coupling members into intimate contact with said first and second flanges, said tightening means comprising:

a rotatable member, said rotatable member being oriented in an axial direction parallel to the axis of the coupled coaxial flanges, first and second tightening members engaging said first and second arcuate coupling members, connecting means for connecting said first tightening member to said second tightening member, and retaining means, coupled to said first and second tightening members, for retaining said first tightening member in proximity to said second tightening member, said retaining means including a U-shaped member engaging said first tightening member and a pin coupled to said second tightening member and to said U-shaped member.

2. A coupling device according to claim 1, wherein said tightening means includes camming means for moving said second ends into closer proximity in response to rotation of said axially-oriented, rotatable member.

3. A coupling device according to claim 1, wherein said tightening means includes two camming surfaces.

4. A coupling device according to claim 3, wherein each of said second ends of said first and second arcuate coupling members includes a cam follower surface, each of said cam follower surfaces engaging one of said camming surfaces on said tightening means.

5. A coupling device according to claim 4, wherein said camming surfaces each define an acute angle with the coaxial axes of the flanges.

6. A coupling device according to claim 5, wherein each of said acute angles is about 45°.

7. A coupling device according to claim 1 wherein said connecting means comprises a threaded bolt, and said rotatable member comprises a threaded nut threadedly engaging said bolt.

8. A device for coupling a first peripheral flange on a first annular member and a second peripheral flange on a second annular member, these flanges being coaxial, the device comprising:
at least first and second arcuate coupling members, each said arcuate coupling member having an inner surface including a recess for receiving portions of the first and second peripheral flanges therein, and having first and second ends;
coupling means for releasable coupling said first ends of said two arcuate coupling members together, said coupling means including a first portion attached to said first end of said first arcuate coupling member and a second portion attached to said first end of said second arcuate coupling member, said first and second portions being releasable coupled together; and
tightening means, coupled to the other ends of said arcuate coupling members, for coupling said other ends together and for radially inwardly moving said arcuate coupling members into contact with said first and second flanges;
said tightening means including an axially oriented rotatable member which, when rotated, moves in an axial direction parallel to the axis of the coupled coaxial flanges and tightens the device around the flanges,
said tightening means further including two camming surfaces,
each of said other ends of said arcuate coupling members including a cam follower surface,
each one of said camming surfaces engaging one of said cam follower surfaces to move said other ends into closer proximity in response to rotation of said axially oriented rotatable member,
said tightening means further comprising
first and second tightening members engaging said other ends of said arcuate coupling members,
connecting means for connecting said first and second tightening members, and
retaining means coupled to said first and second tightening members to limit the movement of the first tightening member relative to the second tightening member.

9. A coupling device according to claim 8, wherein
said camming surfaces are on said second tightening member,
said first tightening member has first and second coplanar surfaces which abut said peripheral flanges.

10. A coupling device according to claim 9, wherein said retaining means includes a U-shaped member which receives the connecting means therein,
said first tightening member being slidably connected to said retaining means.

11. A coupling device according to claim 10 wherein said connecting means includes a threaded bolt, and said rotatable member comprises a threaded nut threadedly engaging said bolt.

* * * * *